United States Patent
Mizoguchi

(10) Patent No.: US 6,360,077 B2
(45) Date of Patent: *Mar. 19, 2002

(54) MOBILE RADIO COMMUNICATION DEVICE PROVIDED WITH FUNCTIONS FOR DETECTING AND INFORMING INTERFERENCE

(75) Inventor: Tamiyuki Mizoguchi, Tokyo (JP)

(73) Assignee: NEC Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/123,526

(22) Filed: Jul. 28, 1998

(30) Foreign Application Priority Data

Jul. 31, 1997 (JP) .............................................. 9-206440

(51) Int. Cl.⁷ ............................. H04B 17/00; H04B 1/10
(52) U.S. Cl. ........................................ 455/67.3; 455/63
(58) Field of Search ................................ 455/67.1, 67.3, 455/115, 425, 278.1, 283, 296, 63; 375/349

(56) References Cited

U.S. PATENT DOCUMENTS

| | | | | |
|---|---|---|---|---|
| 5,345,597 A | * | 9/1994 | Strawczynski et al. | 455/450 |
| 5,375,123 A | * | 12/1994 | Andersson et al. | 370/95 |
| 5,640,684 A | * | 6/1997 | Konosu et al. | 455/67.7 |
| 5,870,666 A | * | 2/1999 | Tanaka et al. | 455/67.1 |
| 5,995,811 A | * | 11/1999 | Watanabe | 455/115 |
| 6,201,795 B1 | * | 3/2001 | Baum et al. | 370/252 |

FOREIGN PATENT DOCUMENTS

| | | |
|---|---|---|
| JP | 1-148000 | 6/1989 |
| JP | 3-128546 | 5/1991 |
| JP | 4-207233 | 7/1992 |
| JP | 4-249949 | 9/1992 |
| JP | 6-62002 | 3/1994 |
| JP | 6-69862 | 3/1994 |
| JP | 8-321818 | 12/1996 |
| JP | 2598539 | 1/1997 |
| JP | 9-284344 | 10/1997 |
| WO | WO 93/10601 | 5/1993 |
| WO | WO 95/24810 | 9/1995 |

OTHER PUBLICATIONS

Japanese Office Action dated Sep. 14, 1999, with partial translation.
British Search Report dated Jan. 8, 1999.
Japanese Office Action dated Sep. 14, 1999, with partial translation.

* cited by examiner

*Primary Examiner*—Vivian Chang
*Assistant Examiner*—Charles N. Appiah
(74) *Attorney, Agent, or Firm*—McGinn & Gibb, PLLC

(57) ABSTRACT

A mobile radio communication device for performing communication with a base station comprises an interference detection measure for detecting occurrence of interference to the downlink frequency and/or the uplink frequency, and an interference informing measure for transmitting information about the occurrence of the interference to the base station. The base station which received the information about the interference assigns the mobile radio communication device new time slots or a new communication carrier frequency. The mobile radio communication device has a transmission system and two reception systems which are composing a post-detection selective space diversity system, and each of the two reception systems is composed of a double superheterodyne system, in the same way as general conventional mobile radio communication devices. Interference to the downlink frequency is detected utilizing the data error rate in the demodulated reception signal in one reception system, and interference to the uplink frequency is detected utilizing the field intensity of a radio wave having the uplink frequency received by an antenna of the other reception system. The detection and informing of interference is realized by addition of a simple circuit composed of a circulator, a high frequency amplifier, a mixer and a switch to a general conventional mobile radio communication device.

23 Claims, 3 Drawing Sheets

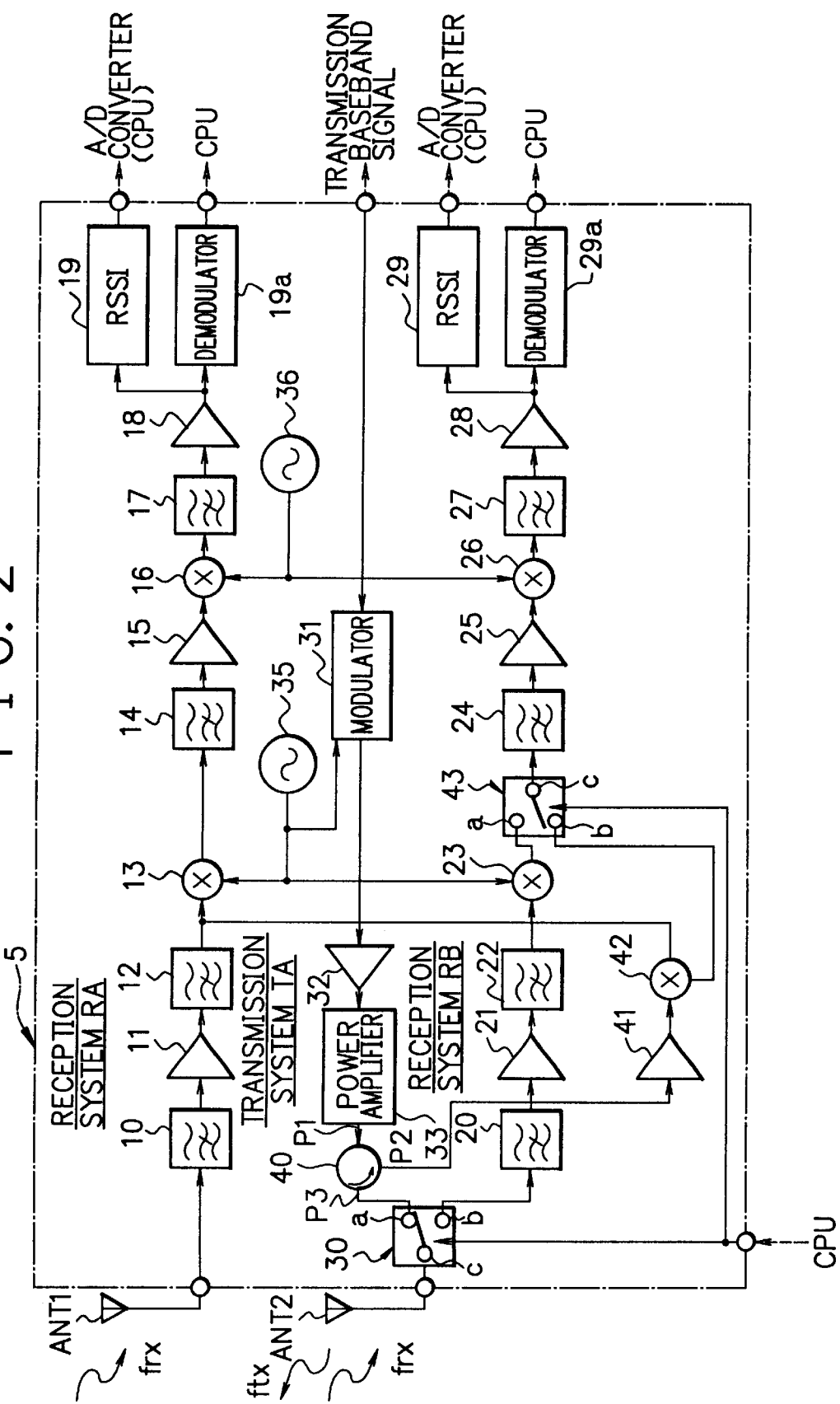

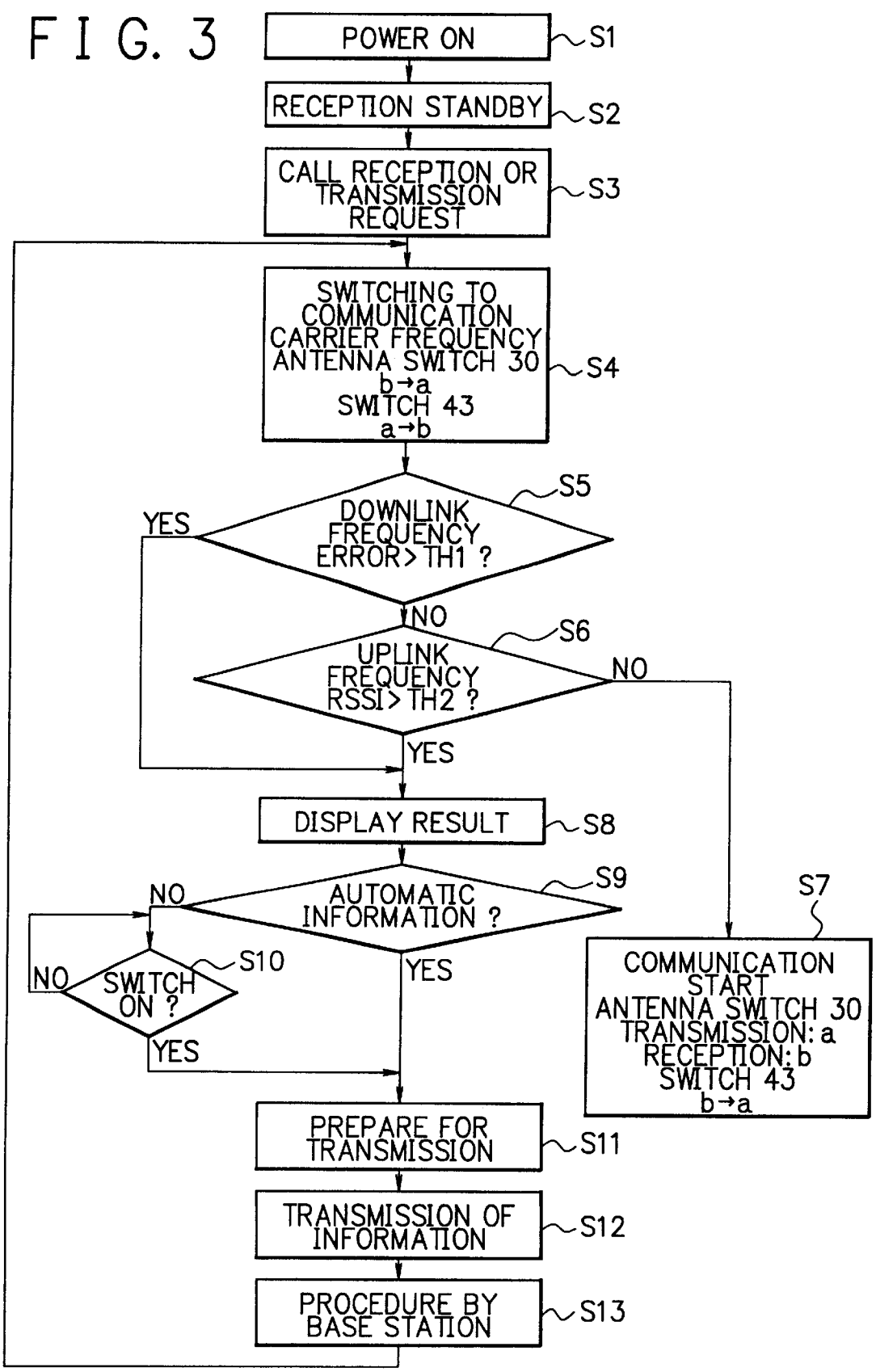

MOBILE RADIO COMMUNICATION DEVICE PROVIDED WITH FUNCTIONS FOR DETECTING AND INFORMING INTERFERENCE

BACKGROUND OF THE INVENTION

The present invention relates to a mobile radio communication device such as a portable telephone which performs communication with a base station using a downlink frequency and an uplink frequency which are assigned to the mobile radio communication device by the base station, and in particular, to a mobile radio communication device which is provided with functions for detecting occurrence of interference to the downlink frequency and/or the uplink frequency and informing the base station of the occurrence of the interference.

DESCRIPTION OF THE PRIOR ART

Post-detection selective space diversity systems provided with two reception systems are generally employed for ensuring stable radio wave reception and communication even when electric field intensity is decreased due to fading which is characteristic of mobile communication, in which a post-detection reception signal having higher post-detection field intensity is selected from two reception signals which have been received by the two reception systems.

FIG. 1 is a block diagram showing composition of a conventional mobile radio communication device (a mobile terminal 5) which employs the post-detection selective space diversity system. The mobile terminal 5 is provided with two reception systems RA and RB each of which is composed of a double superheterodyne system in which demodulation of the reception signal is executed after two steps of frequency conversions. Along with the reception systems RA and RB, the mobile terminal 5 is provided with a transmission system TA. A first oscillator 35 and a second oscillator 36 are provided in order to generate a first local oscillation signal and a second local oscillation signal to be used for the first frequency conversion and the second frequency conversion (double superheterodyne) which are performed in each of the reception systems RA and RB. The first oscillator 35 is also used by the transmission system TA for converting the frequency of a modulated signal for being transmitted into a transmission frequency.

The reception system RA of the mobile terminal 5 is provided with an antenna ANT1 for receiving a radio wave having a downlink frequency frx (a frequency transmitted by an unshown base station to the mobile terminal 5). The reception system RB is provided with an antenna ANT2 for receiving a radio wave having the downlink frequency frx and transmitting a radio wave having an uplink frequency ftx (a frequency transmitted by the mobile terminal 5 to an unshown base station).

The reception system RB is provided with an antenna switch 30 for switching the function of the antenna ANT2 between reception and transmission. Hereafter, with respect to components which are common to both the reception systems RA and RB, explanation will be given on the reception system RA only, and reference numbers in round brackets ( ) represent components of the reception system RB which are equivalent to components of the reception system RA. In the example of FIG. 1, the reception system RA (RB) is provided with a band pass filter (BPF) 10 (20) for limiting the bandwidth of the reception signal (i.e. for rejecting unnecessary signals) supplied from the antenna ANT1, and a high frequency amplifier 11 (21) for amplifying the reception signal.

Further, the reception system RA (RB) of the mobile terminal 5 is provided with a BPF 12 (22) for further limiting the bandwidth of the reception signal supplied from the high frequency amplifier 11 (21), a first mixer 13 (23) for converting the reception signal into a first intermediate frequency signal (first IF signal) utilizing the first local oscillation signal supplied from the first oscillator 35, a BPF 14 (24) for limiting the bandwidth of the first IF signal supplied from the first mixer 13 (23), and a first intermediate frequency amplifier 15 (25) for amplifying the first IF signal supplied from the BPF 14 (24).

Further, the reception system RA (RB) is provided with a second mixer 16 (26) for converting the first IF signal into a second intermediate frequency signal (second IF signal) utilizing the second local oscillation signal supplied from the second oscillator 36, a BPF 17 (27) for limiting the bandwidth of the second IF signal supplied from the second mixer 16 (26), and a second intermediate frequency amplifier 18 (28) for amplifying the second IF signal supplied from the BPF 17 (27). After the second intermediate frequency amplifier 18 (28), the reception system RA (RB) is provided with an RSSI section 19 (29) for outputting an RSSI (Received Signal Strength Indicator) signal whose signal level varies according to the field intensity of the reception signal (the second IF signal), and a demodulator 19a (29a) for demodulating the second IF signal and thereby outputting a demodulated signal such as a baseband signal.

The transmission system TA of the mobile terminal 5 is provided with a modulator 31 for modulating the baseband signal utilizing the first local oscillation signal supplied from the first oscillator 35, a driver amplifier 32 as a preliminary amplifier for obtaining gain, and a power amplifier 31 for amplifying the modulated signal and supplying the amplified transmission signal to the antenna ANT1 via the antenna switch 30.

In the following, the operation of the conventional mobile radio communication device will be described. Incidentally, explanation of the operation of the transmission system TA is omitted for brevity.

In the reception system RA, a reception signal with the downlink frequency frx which has been received by the antenna ANT1 and whose bandwidth has been limited by the BPF 10 is supplied to the high frequency amplifier 11. Meanwhile, in the reception system RB, a reception signal with the downlink frequency frx which has been received by the antenna ANT2 at the same time is supplied to the antenna switch 30. When signal reception is performed, the antenna switch 30 is controlled by an unshown CPU etc. so as to connect the movable terminal c to the fixed terminal b, and thus the reception signal is supplied from the antenna switch 30 to the high frequency amplifier 21 via the bandwidth limiting BPF 20.

Thereafter, the reception systems RA and RB operate in the same way, therefore, only the operation of the reception system RA will be described in the following. Incidentally, reference numbers in round brackets ( ) represent components of the reception system RB. The reception signal outputted by the high frequency amplifier 11 (21) is supplied to the first mixer 13 (23) via the bandwidth limiting BPF 12 (22). The first mixer 13 (23) is also supplied with the first local oscillation signal from the first oscillator 35, and the reception signal is frequency converted by the first mixer 13 (23) into the first IF (intermediate frequency) signal having the first intermediate frequency which is lower than the downlink frequency frx.

The first IF signal is supplied to the second mixer 16 (26) via the BPF 14 (24) and the first intermediate frequency amplifier 15 (25). The second mixer 16 (26) is also supplied with the second local oscillation signal from the second oscillator 36, and the first IF signal is frequency converted by the second mixer 16 (26) into the second IF (intermediate frequency) signal whose frequency is lower than the first IF signal. The second IF signal outputted by the second mixer 16 (26) is supplied to the RSSI section 19 (29) and the demodulator 19*a* (29*a*).

The demodulator 19*a* (29*a*) demodulates the second IF signal and thereby outputs a demodulated signal such as a baseband signal to the unshown CPU etc. Meanwhile, the RSSI section 19 (29) outputs the RSSI (Received Signal Strength Indicator) signal having a signal level corresponding to the field intensity of the reception signal (the second IF signal) into the CPU via an unshown A/D converter. Then, the CPU selects one demodulated signal having larger intensity from the two demodulated signals supplied from the reception systems RA and RB by comparing the RSSI signals, and acquires the demodulated signal having larger intensity. Signal reception according to the post-detection selective space diversity system is performed by the conventional mobile radio communication device as described above.

However, in the above conventional mobile radio communication device of FIG. 1, when interference occurred between the reception signal having the downlink frequency frx and other radio waves (interfering signals), or between the transmission signal having the uplink frequency ftx and other radio waves (interfering signals), communication between the base station and the mobile terminal 5 becomes impossible. In such cases, the sources of the interfering radio waves have to be tracked down and transmission of the interfering waves have to be stopped. However, it is very difficult to determine the sources of interfering waves, and it is substantially impossible to track down the sources or the directions of the sources utilizing directional antennas especially when the interference waves come from far-off sources, mobile stations, etc.

There have been some techniques proposed for resolving the interference problem. In a conventional mobile radio communication device which is disclosed in Japanese Patent Application Laid-Open No. HEI4-249949, "CORDLESS TELEPHONE", a fixed station is provided with a fixed station reception circuit as well as a mobile terminal reception circuit, and the fixed station performs judgment on idle channels by further detecting radio wave signals transmitted by other fixed stations. By the information concerning the idle channels obtained by the detection of the signals from other fixed stations, interference between transmission signals of the fixed station and transmission signals of other fixed stations is avoided.

However, the above second conventional mobile radio communication device needs to be provided with the fixed station reception circuit for detecting transmission signals from other fixed stations and a judgment circuit for performing judgment on idle channels, and thus construction of the mobile radio communication device is necessitated to be complicated.

SUMMARY OF THE INVENTION

It is therefore the primary object of the present invention to provide a mobile radio communication device in which the mixing of interfering signals to the downlink frequency and/or the uplink frequency can be avoided and interruption of communication can be prevented, and thereby communication reliability and transmission efficiency can be improved.

Another object of the present invention is to provide a mobile radio communication device in which the avoidance of the mixing of interfering signals can be attained by a simple additional circuit, and thereby enlargement of circuit scale and signal processing scale of the device can be avoided and increase in power consumption can be prevented.

Another object of the present invention is to provide a mobile radio communication device in which the communication carrier frequency can be switched to another frequency when the mixing of interfering signals occurred, and thereby effective use of frequencies can be realized.

Another object of the present invention is to provide a mobile radio communication device in which whether the occurrence of mixing of interfering signals should be informed to the base station or not can be judged and determined on the side of the mobile terminal, and thereby flexibility in usage and device construction of can be increased.

In accordance with a first aspect of the present invention, there is provided a mobile radio communication device for performing communication with a base station comprising an interference detection means and an interference informing means. The interference detection means detects occurrence of the mixing of interfering signals into the downlink frequency and/or the uplink frequency which are used for the communication between the base station and the mobile radio communication device, and the interference informing means transmits information about the occurrence of the mixing of interfering signals into the downlink frequency and/or the uplink frequency to the base station in order to let the base station assign the mobile radio communication device new time slots or a new communication carrier frequency.

In accordance with a second aspect of the present invention, in the first aspect, the mobile radio communication device is provided with a transmission system and two reception systems which are composing a post-detection selective space diversity system in which one demodulated signal is selected from two demodulated signals outputted by the two reception systems based on the levels of RSSI (Received Signal Strength Indicator) signals which correspond to the field intensity of post-detection reception signals, and each of the two reception systems is composed of a double superheterodyne system in which demodulation of the reception signal is executed after two steps of frequency conversions.

In accordance with a third aspect of the present invention, in the first aspect, the communication between the base station and the mobile radio communication device is performed according to TDMA-FDD (Time Division Multiplexing Access-Frequency Division Duplex) method, and transmission by the base station is executed according to TDM (Time Division Multiplexing) method.

In accordance with a fourth aspect of the present invention, in the first aspect, the detection of occurrence of the mixing of interfering signals into the downlink frequency is performed by means of judgment with respect to the data error rate in demodulated reception signals.

In accordance with a fifth aspect of the present invention, in the first aspect, the detection of occurrence of the mixing of interfering signals into the uplink frequency is performed by means of judgment with respect to an RSSI (Received Signal Strength Indicator) signal whose signal level varies corresponding to the field intensity of an interfering reception signal having a carrier frequency equal to the uplink frequency.

In accordance with a sixth aspect of the present invention, in the first aspect, the interference informing means informs the base station of the occurrence of the mixing of interfering signals into the downlink frequency and/or the uplink frequency, using the control channel.

In accordance with a seventh aspect of the present invention, in the first aspect, the interference informing means informs the base station of the occurrence of the mixing of interfering signals into the downlink frequency and/or the uplink frequency, by repeating transmission using the uplink frequency.

In accordance with an eighth aspect of the present invention, in the second aspect, each of the two reception systems includes a reception means provided with an antenna for receiving signals, a first frequency conversion means for converting the reception signal supplied from the reception means into a first intermediate frequency signal, a second frequency conversion means for converting the first intermediate frequency signal supplied from the first frequency conversion means into a second intermediate frequency signal, a demodulation means for demodulating the second intermediate frequency signal supplied from the second frequency conversion means and thereby outputting a demodulated signal, and an RSSI section for outputting an RSSI (Received Signal Strength Indicator) signal whose signal level varies corresponding to the intensity of the second intermediate frequency signal supplied from the second frequency conversion means and thereby indicating the field intensity of the reception signal.

In accordance with a ninth aspect of the present invention, in the eighth aspect, one of the reception systems further includes an antenna function switching means and an interference detection signal generation means. The antenna function switching means switches the function of the antenna of the reception system between reception and transmission by selectively connecting the transmission system to the antenna of the reception system in order to utilize the antenna for transmission. The interference detection signal generation means converts an interfering reception signal having the uplink frequency which has been received by the antenna of the reception system into an interference detection signal whose frequency is equal to the first intermediate frequency, and supplies the interference detection signal to the second frequency conversion means of the reception system so that the mixing of interfering signals into the uplink frequency can be detected.

In accordance with a tenth aspect of the present invention, in the ninth aspect, the interference detection signal generation means includes an antenna common use means, a mixing means, and a selection means. The antenna common use means draws out the interfering reception signal having the uplink frequency which has been received by the antenna of the reception system in the case where the antenna is used for reception of the interfering reception signal, and supplies a transmission signal outputted by the transmission system to the antenna in the case where the antenna is used for transmission. The mixing means mixes the interfering reception signal having the uplink frequency which has been drawn out by the antenna common use means with a reception signal having the downlink frequency which has been received by the antenna of the other reception system and thereby converts the interfering reception signal into the interference detection signal. And the selection means executes selection between the first intermediate frequency signal supplied from the first frequency conversion means and the interference detection signal supplied from the mixing means, and supplies the selected signal to the second frequency conversion means.

In accordance with an eleventh aspect of the present invention, in the tenth aspect, the antenna common use means is a circulator which is placed between the antenna function switching means and the transmission system.

In accordance with a twelfth aspect of the present invention, in the tenth aspect, the interference detection signal generation means further includes a high frequency amplifier which is placed between the antenna common use means and the mixing means.

In accordance with a thirteenth aspect of the present invention, in the eighth aspect, the mobile radio communication device further comprises band pass filters and amplifiers which are placed in front of the first frequency conversion means, between the first frequency conversion means and the second frequency conversion means, and after the second frequency conversion means.

In accordance with a fourteenth aspect of the present invention, in the first aspect, the mobile radio communication device further comprises an automatic information means for automatically activating the interference informing means when occurrence of the mixing of interfering signals into the downlink frequency or the uplink frequency is detected by the interference detection means, and automatically informing the base station of the occurrence of the interference utilizing the interference informing means.

In accordance with a fifteenth aspect of the present invention, in the first aspect, the mobile radio communication device further comprises an interference display means and a manual operation information means. The interference display means displays occurrence of interference when occurrence of the mixing of interfering signals into the downlink frequency or the uplink frequency is detected by the interference detection means. The manual operation information means receives manual operation of the user who has seen the display on the interference display means and who is requesting transmission of information about the occurrence of the interference to the base station, and informs the base station of the occurrence of the interference utilizing the interference informing means if the user executed the manual operation.

BRIEF DESCRIPTION OF THE DRAWINGS

The objects and features of the present invention will become more apparent from the consideration of the following detailed description taken in conjunction with the accompanying drawings, in which:

FIG. 2 is a block diagram showing composition of a mobile radio communication device according to an embodiment of the present invention; and FIG. 3 is a flow chart showing the operation of the mobile radio communication device of FIG. 2.

DESCRIPTION OF THE PREFERRED EMBODIMENTS

Figure 1:
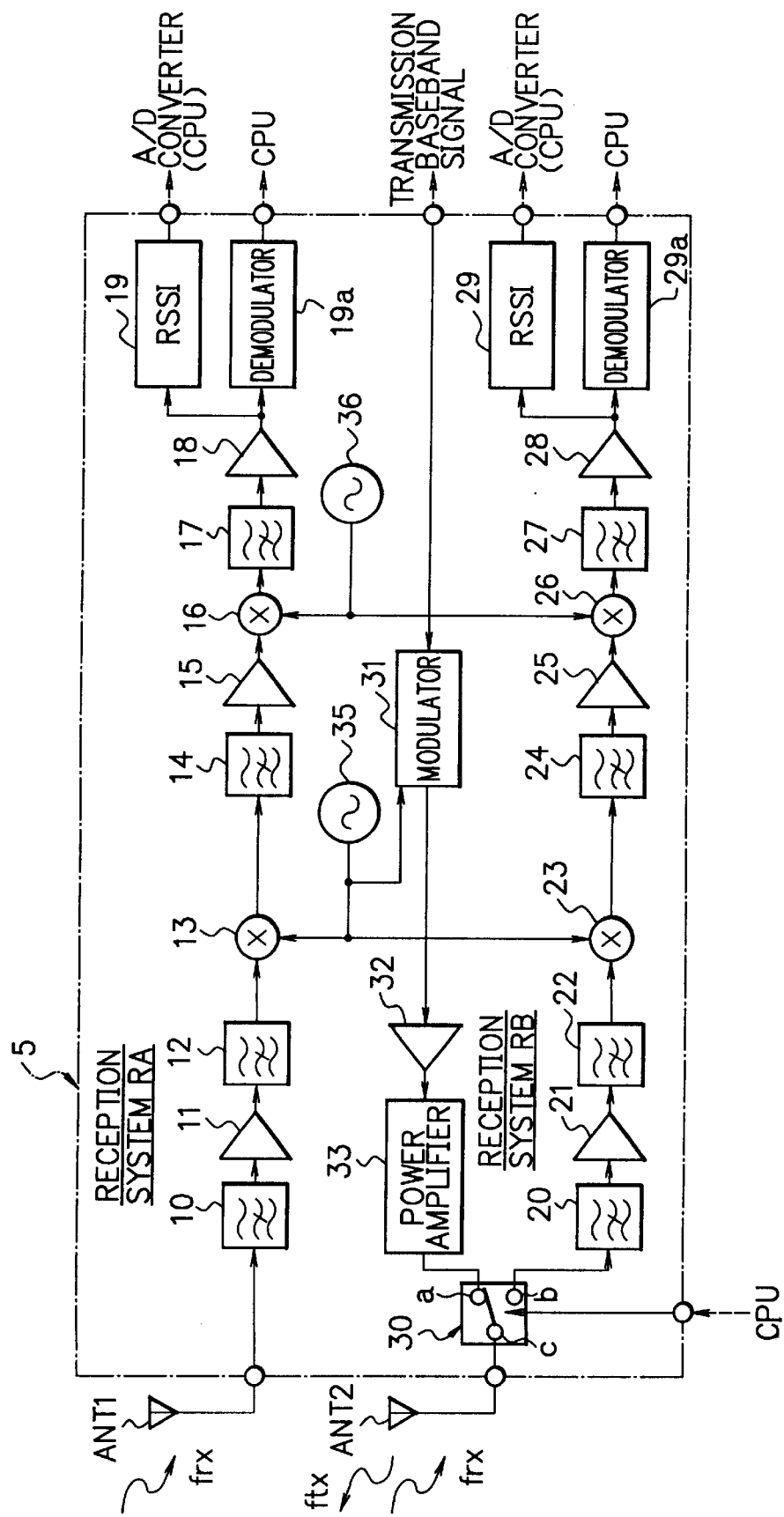
FIG. 1 is a block diagram showing composition of a conventional mobile radio communication device which employs the post-detection selective space diversity system.

Referring now to the drawings, a description will be given in detail of preferred embodiments in accordance with the present invention, in which the same reference characters as those of FIG. 1 designate the same or corresponding parts to those of FIG. 1.

FIG. 2 is a block diagram showing composition of a mobile radio communication device (a mobile terminal 5) according to an embodiment of the present invention. The mobile terminal 5 is provided with two reception systems RA and RB which are composing the aforementioned post-detection selective space diversity system. Each of the reception systems RA and RB is composed of a double superheterodyne system in which demodulation of the reception signal is executed after two steps of frequency conversions. In this example, TDMA-FDD (Time Division Multiplexing Access-Frequency Division Duplex) method is employed for communication between the mobile terminal 5 and an unshown base station, for example.

Along with the reception systems RA and RB, the mobile terminal 5 is provided with a transmission system TA. A first oscillator 35 and a second oscillator 36 are provided in order to generate a first local oscillation signal and a second local oscillation signal to be used for the first frequency conversion and the second frequency conversion (double superheterodyne) which are performed in each of the reception systems RA and RB. The first oscillator 35 is also used by the transmission system TA for converting the frequency of a modulated signal for being transmitted into a transmission frequency.

The reception system RA of the mobile terminal 5 is provided with an antenna ANT1 for receiving a radio wave having a downlink frequency frx (a frequency transmitted by an unshown base station. The reception system RB is provided with an antenna ANT2 for receiving a radio wave having the downlink frequency frx and transmitting a radio wave having an uplink frequency ftx (a frequency transmitted by the mobile terminal 5 to an unshown base station), and an antenna switch 30 for switching the function of the antenna ANT2 between reception and transmission.

Hereafter, with respect to components which are common to both the reception systems RA and RB, explanation will be given on the reception system RA only, and reference numbers in round brackets ( ) represent components of the reception system RB which are equivalent to components of the reception system RA. The reception system RA (RB) is provided with a band pass filter (BPF) 10 (20) for limiting the bandwidth of the reception signal (i.e. for rejecting unnecessary signals) supplied from the antenna ANT1, a high frequency amplifier 11 (21) for amplifying the reception signal, a BPF 12 (22) for further limiting the bandwidth of the reception signal supplied from the high frequency amplifier 11 (21), a first mixer 13 (23) for converting the reception signal into a first intermediate frequency signal (first IF signal) utilizing the first local oscillation signal supplied from the first oscillator 35, a BPF 14 (24) for limiting the bandwidth of the first IF signal supplied from the first mixer 13 (23), and a first intermediate frequency amplifier 15 (25) for amplifying the first IF signal supplied from the BPF 14 (24).

Further, the reception system RA (RB) is provided with a second mixer 16 (26) for converting the first IF signal into a second intermediate frequency signal (second IF signal) utilizing the second local oscillation signal supplied from the second oscillator 36, a BPF 17 (27) for limiting the bandwidth of the second IF signal supplied from the second mixer 16 (26), and a second intermediate frequency amplifier 18 (28) for amplifying the second IF signal supplied from the BPF 17 (27). After the second intermediate frequency amplifier 18 (28), the reception system RA (RB) is provided with an RSSI section 19 (29) for outputting an RSSI (Received Signal Strength Indicator) signal whose signal level varies corresponding to the field intensity of the reception signal (the second IF signal), and a demodulator 19a (29a) for demodulating the second IF signal and thereby outputting a demodulated signal such as a baseband signal. The composition of the reception systems RA and RB described above is basically the same as that of the reception systems RA and RB of the conventional mobile radio communication device which has been shown in FIG. 1.

The reception system RB of the mobile radio communication device of FIG. 2 is further provided with a circulator 40 which is placed between the antenna switch 30 and the transmission system TA for drawing out a specific reception signal (interfering signal) having the uplink frequency ftx which has been received by the antenna ANT2 via the port P3 and the port P2, a high frequency amplifier 41 for amplifying the reception signal (interfering signal) supplied via the circulator 40, a mixer 42 for mixing the interfering reception signal supplied from the high frequency amplifier 41 with the reception signal having the downlink frequency frx which has been received by the antenna ANT1 and thereby generating an interference detection signal, and a switch 43 for executing selection between the first IF signal supplied from the first mixer 23 and the interference detection signal supplied from the mixer 42 and supplying the selected signal to the BPF 24.

Incidentally, the above circuit composed of the circulator 40, the high frequency amplifier 41, the mixer 42, the switch 43 and the BPF 24 is provided in order to draw out the interfering reception signal whose frequency is equal to the uplink frequency ftx. In the mixer 42, the interference detection signal whose frequency is equal to the difference between the frequency of the interfering reception signal and the downlink frequency frx is generated. Therefore, the BPF 24 is utilized by the circuit for passing an interference detection signal whose frequency is equal to the difference between the uplink frequency ftx and the downlink frequency frx. On the other hand, the BPF 24 is also utilized by the reception system RB for passing the first IF signal (for limiting the bandwidth of the first IF signal) supplied from the first mixer 23. Therefore, in the mobile terminal 5 shown in FIG. 2, the first IF (intermediate frequency) is predetermined so as to be equal to the difference between the uplink frequency ftx and the downlink frequency frx, in other words, the frequency of the first local oscillation signal generated by the first oscillator 35 is preset so as to be equal to the uplink frequency ftx.

The transmission system TA of the mobile terminal 5 shown in FIG. 2 is provided with a modulator 31 for modulating the baseband signal utilizing the first local oscillation signal supplied from the first oscillator 35, a driver amplifier 32 as a preliminary amplifier for obtaining gain, and a power amplifier 31 for amplifying the modulated signal and supplying the amplified transmission signal to the antenna ANT1 via the circulator 40 and the antenna switch 30.

In the following, an outline of communication between the base station and the mobile terminal 5 of FIG. 2 will be described.

The mobile terminal 5 performs communication with the base station according to the TDMA-FDD method etc. Therefore, communication according to time division multiplexing in which particular time slots are assigned to the mobile terminal 5 is executed between the base station and the mobile terminal 5. In the communication between the base station and the mobile terminal 5, a downlink frequency frx and an uplink frequency ftx which is different from the downlink frequency frx are assigned to the mobile terminal 5 by the base station, and the downlink frequency frx is used for transmission from the base station to the mobile terminal 5, and the uplink frequency ftx is used for transmission from the mobile terminal 5 to the base station.

For example, in the case where the transmission frequency of the mobile terminal 5 is equal to ftx and the reception frequency of the mobile terminal 5 is equal to frx, the following equation (1) holds.

$$ftx = frx \pm fIF \quad (1)$$

Here, the x is an integer as a numerical subscript, and the fIF is a fixed frequency. Even when a plurality of (N pieces of) carrier wave frequencies are prepared for communication between the base station and the mobile terminal 5, the difference between a downlink frequency frx and a corresponding uplink frequency ftx is maintained constant so as to be equal to fIF. The equation (1) can also be expressed as the following equation (2).

$$|ft0-fr0| = |ft1-fr1| = |ft2-fr2| = \ldots = |ftN-frN| = fIF \ldots \quad (2)$$

By use of the downlink frequency carrier wave, the base station keeps on transmitting some kind of data according to the TDM (time division multiplexing) method, continuously. Incidentally, the downlink frequency frx and the uplink frequency ftx is used for control channel communication.

In the following, the operation of the mobile radio communication device (mobile terminal 5) of FIG. 2 after connection between the mobile terminal 5 and the base station is established will be described, first. Incidentally, explanation of the operation of the transmission system TA is omitted for brevity. After connection between the mobile terminal 5 is established, communication between the base station and the mobile terminal 5 is executed using a communication carrier frequency (a downlink frequency frx and an uplink frequency ftx) which has been assigned to the mobile terminal 5 by the base station.

In the reception system RA, a reception signal with the downlink frequency frx which has been received by the antenna ANT1 and whose bandwidth has been limited by the BPF 10 is supplied to the high frequency amplifier 11. Meanwhile, in the reception system RB, a reception signal with the downlink frequency frx which has been received by the antenna ANT2 at the same time is supplied to the antenna switch 30. In the reception standby state, the antenna switch 30 is controlled by an unshown CPU etc. so as to connect the movable terminal c to the fixed terminal b, and thus the reception signal in the reception system RB is supplied from the antenna switch 30 to the BPF 20 to be limited its bandwidth and is supplied to the high frequency amplifier 21.

Thereafter, the reception systems RA and RB operate almost in the same way, therefore, the operation of the reception system RA will be mainly described in the following, in which reference numbers in round brackets ( ) represent components of the reception system RB. The reception signal outputted by the high frequency amplifier 11 (21) is executed bandwidth limiting by the BPF 12 (22) and is supplied to the first mixer 13 (23). The first mixer 13 (23) is also supplied with the first local oscillation signal from the first oscillator 35, and the reception signal is frequency converted by the first mixer 13 (23) into the first IF (intermediate frequency) signal having the first intermediate frequency which is lower than the downlink frequency frx.

The first IF signal in the reception system RA is supplied to the BPF 14 to be limited its bandwidth, and is supplied to the first intermediate frequency amplifier 15 to be amplified, and is supplied to the second mixer 16. The first IF signal in the reception system RB is supplied to the BPF 24 via the switch 43 to be limited its bandwidth, and is supplied to the first intermediate frequency amplifier 25 to be amplified, and is supplied to the second mixer 26. The second mixer 16 (26) is also supplied with the second local oscillation signal from the second oscillator 36, and the first IF signal is frequency converted by the second mixer 16 (26) into the second IF (intermediate frequency) signal whose frequency is lower than the first IF signal. The second IF signal outputted by the second mixer 16 (26) is supplied to the RSSI section 19 (29) and the demodulator 19a (29a).

The demodulator 19a (29a) demodulates the second IF signal and thereby outputs a demodulated signal such as a baseband signal to the unshown CPU etc. Meanwhile, the RSSI section 19 (29) outputs the RSSI (Received Signal Strength Indicator) signal having a signal level corresponding to the field intensity of the reception signal (the second IF signal) into the CPU via an unshown A/D converter. Then, the CPU selects one demodulated signal having larger intensity from the two demodulated signals supplied from the reception systems RA and RB by comparing the RSSI signals, and acquires the demodulated signal having larger intensity. Signal reception according to the post-detection selective space diversity system is performed by the mobile radio communication device of FIG. 2 as described above. Incidentally, post-detection selective space diversity reception is also performed by the mobile terminal 5 during the reception standby state, at control channel carrier frequency.

In the following, the operation of the mobile radio communication device (mobile terminal 5) of FIG. 2 before connection between the mobile terminal 5 and the base station is established will be described.

FIG. 3 is a flow chart showing the operation of the mobile radio communication device (mobile terminal 5) of FIG. 2 according to the present invention. After the power switch of the mobile terminal 5 is turned ON (step S1), the mobile terminal 5 goes into the reception standby state. In the reception standby state, the mobile terminal 5 waits for reception of a call using a control channel (using a control channel carrier frequency (a downlink frequency frx and an uplink frequency ftx)) which is common to a plurality of mobile terminals 5 (step S2). If reception of a call from the base station or a request for transmission by the user of the mobile terminal 5 occurs (step S3), the carrier frequency used by the mobile terminal 5 is switched from the control channel carrier frequency to a communication carrier frequency (a downlink frequency frx and an uplink frequency ftx) according to an assignment by the base station (step S4). In the reception standby state of the step S2, the mobile terminal 5 executes post-detection selective space diversity reception of the common control channel utilizing both the reception systems RA and RB, with the movable terminal c of the antenna switch 30 connected to the fixed terminal b, and with the movable terminal c of the switch 43 connected to the fixed terminal a. On the switching to the communication carrier frequency according to instructions of the base station (step S4), the movable terminal c of the antenna switch 30 is switched to the side of the fixed terminal a, and the movable terminal c of the switch 43 is switched to the side of the fixed terminal b, in preparation of the next steps in which detection of interference to the downlink frequency frx and the uplink frequency ftx is performed. Here, the interference can be the mixing of interfering signals transmitted by illegal radio communication devices into signals on the downlink frequency frx or the uplink frequency ftx which are used between the base station and the mobile terminal 5, the mixing of interfering signals transmitted by other mobile terminals which are out of order into time slots on the downlink frequency frx or the uplink frequency ftx which are assigned by the base station to the mobile terminal 5, etc.

In step S5, detection of interference into the downlink frequency frx is performed using the reception system RA. The detection of the interference with the downlink frequency frx is performed by checking the data error rate of the demodulated signal which is supplied from the demodulator 19a in the time slots which are assigned to the mobile terminal 5. It is judged by the unshown CPU whether or not the data error rate of the demodulated signal in the assigned time slots is larger than a predetermined threshold value TH1 (step S5). If the data error rate is larger than the threshold value TH1, it is judged that the mixing of interfering signals into the time slots on the downlink frequency frx occurred, and the result of the judgment (that the mixing of interfering signals into the time slots on the downlink frequency frx occurred) is stored in a RAM etc. by setting a first interference flag in the RAM ON for example, and process directly proceeds to step S8. Otherwise, it is judged that interference into the time slots on the downlink frequency frx is not occurring, and the process proceeds to the next step S6 for performing detection of interference into the uplink frequency ftx.

In the step S6, detection of interference into the uplink frequency ftx is performed. The detection of the mixing of interfering signals into the uplink frequency ftx is executed as follows. First, if an interfering signal having a carrier frequency which is equal to the uplink frequency ftx existed, the interfering signal is received by the antenna ANT2. The interfering reception signal received by the antenna ANT2 is supplied to the circulator 40 via the antenna switch 30, and is drawn out by the circulator 40 to be supplied to the high frequency amplifier 41 via the port P3 and the port P2. The interfering reception signal is amplified by the high frequency amplifier 41 and supplied to the mixer 42.

The mixer 42 is also supplied with the reception signal having the downlink frequency frx which has been received by the antenna ANT1, via the BPF 10, the high frequency amplifier 11 and the BPF 12. The unshown base station is continuously performing TDM transmission at the downlink frequency frx, and the reception signal having the downlink frequency frx is continuously supplied to the mixer 42 so that frequency conversion by the mixer 42 can be performed at any time. The mixer 42 mixes the interfering reception signal having the uplink frequency ftx which has been received by the antenna ANT2 with the reception signal having the downlink frequency frx which has been received by the antenna ANT1, and thereby generates the interference detection signal. The interference detection signal, whose frequency is equal to the difference between the uplink frequency ftx and the downlink frequency frx (i.e. equal to the first IF (intermediate frequency) for the reason which has been mentioned before), is supplied to the BPF 24 via the switch 43 to be limited its bandwidth.

The interference detection signal is supplied to the RSSI section 29 and the demodulator 29a, via the first intermediate frequency amplifier 25, the second mixer 26, the BPF 27 and the second intermediate frequency amplifier 28. The RSSI section 29 outputs an RSSI signal having a signal level corresponding to the intensity of the interfering reception signal (the second IF signal) into the CPU via an unshown A/D converter. By use of the RSSI signal supplied from the RSSI section 19 via the A/D converter, the CPU performs detection of the mixing of interfering signals into the uplink frequency ftx (step S6). In the step S6, it is judged by the unshown CPU whether or not the RSSI signal is larger than a predetermined threshold value TH2. If the RSSI signal is larger than the threshold value TH2 in the step S6, it is judged that the mixing of interfering signals into the uplink frequency ftx occurred, and the result of the judgment (that the mixing of interfering signals into the uplink frequency ftx occurred) is stored in the RAM etc. by setting a second interference flag in the RAM ON for example, and process proceeds to step S8. If the RSSI signal is not larger than the threshold value TH2 in the step S6, it is judged that interference is not occurring to the downlink frequency frx or the uplink frequency ftx, and process proceeds to step S7.

In the step S7, the movable terminal c of the switch 43 is switched to the side of the fixed terminal a, and communication between the base station and the mobile terminal 5 is started using the downlink frequency frx and the uplink frequency ftx (the communication carrier frequency) which have been assigned by the base station. In the communication between the base station and the mobile terminal 5, the movable terminal c of the antenna switch 30 is connected to the fixed terminal a when transmission is executed by the mobile terminal 5, and the movable terminal c of the antenna switch 30 is connected to the fixed terminal b when the post-detection selective space diversity reception which has been described before is executed by the mobile terminal 5.

In the step S8, the results of the above judgments that interference occurred to the downlink frequency frx and/or the uplink frequency ftx are displayed on the display of the mobile terminal 5 by the control of the CPU. Subsequently, it is checked whether the mobile terminal 5 is preset to inform the base station of the occurrence of the interference automatically or according to operation of the user such as pushing a button. The selection between the 'automatic information' and the 'manual operation information' has been done previously by the user and the setting concerning 'automatic/manual information' has been prestored in the RAM etc.

If the 'automatic information' has been preset (step S9: YES), process directly proceeds to step S11 and preparation for transmission by the transmission system TA is executed in order to inform the base station of the occurrence of interference. In the step S11, the movable terminal c of the switch 43 is switched to the side of the fixed terminal a (with the movable terminal c of the antenna switch 30 connected to the fixed terminal a) according to the control of the unshown CPU. If the 'manual operation information' has been preset (step S9: NO), it is checked by the CPU whether or not the operation of the user such as pushing a button has been done for instructing transmission (step S10). If the operation of the user has been done, process proceeds to the step S11 and preparation for transmission by the transmission system TA is executed in the same way as the case of the automatic information.

Subsequently, transmission for informing the base station of the occurrence of interference is executed by the transmission system TA (step S12). Information transmitted to the base station may include the details of the interference, such as whether the interference occurred to the downlink frequency frx or to the uplink frequency ftx, etc. The transmission can be performed, for example, using the control channel frequency carrier wave (i.e. transmission after switching the carrier frequency from the communication carrier frequency to the control channel carrier frequency). However, it is also possible to execute the transmission of the information by repeating transmission using the interfered uplink frequency ftx (communication carrier frequency) until the information is received by the base station.

Then, the base station which received the information performs procedure for making the communication between the base station and the mobile terminal 5 possible (step S13). In the step S13, the base station assigns other time slots to the mobile terminal 5 which has executed the transmission of information, or assigns another communication carrier frequency (a downlink frequency frx and an uplink frequency ftx) to the mobile terminal 5. After the step S13, process is returned to the step S4 and the steps S4 through S13 is repeated until communication between the base station and the mobile terminal 5 without interference is made possible.

As set forth hereinabove, in the mobile radio communication device according to the present invention, when interference occurred to the downlink frequency frx or the uplink frequency ftx which have been assigned by the base station, the occurrence of interference is detected by the mobile radio communication device and informed to the base station. The base station which received the information can assign the mobile radio communication device new time slots or a new communication carrier frequency. Therefore, the mixing of interfering signals into the communication carrier frequency (i.e. the downlink frequency frx and the uplink frequency ftx) is avoided and interruption of communication is prevented, and thereby communication reliability and transmission efficiency are improved.

Further, the avoidance of the mixing of interfering signals can be attained by a simple additional circuit composed of a circulator, a high frequency amplifier, a mixer and a switch. Therefore enlargement of circuit scale and signal processing scale of the device is avoided and increase in power consumption is prevented.

Furthermore, the communication carrier frequency is switched to another frequency when the mixing of interfering signals occurred. Therefore, effective use of frequencies is realized.

Moreover, whether the occurrence of mixing of interfering signals should be informed to the base station or not can be judged and determined on the side of the mobile terminal. Therefore, flexibility in usage and device construction is increased.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A mobile radio communication device for performing communication with a base station comprising:

interference detection means for detecting occurrence of the mixing of interfering signals into a downlink frequency and an uplink frequency which are used for the communication between the base station and the mobile radio communication device; and interference informing means for transmitting information about the occurrence of the mixing of interfering signals into the downlink frequency and the uplink frequency to the base station in order to let the base station assign the mobile radio communication device new time slots or a new communication carrier frequency, wherein a frequency of said downlink frequency is different from that of said uplink frequency, and wherein said interference detection means mixes said interfering signals having said uplink frequency with said downlink frequency to produce said transmitted information.

2. The mobile radio communication device as claimed in claim 1, wherein the mobile radio communication device includes a transmission system and two reception systems which comprise a post-detection selective space diversity system in which one demodulated signal is selected from two demodulated signals outputted by the two reception systems based on the levels of RSSI (Received Signal Strength Indicator) signals which correspond to the field intensity of post-detection reception signals, and wherein each of the two reception systems includes a double superheterodyne system in which demodulation of the reception signals executed after two steps of frequency conversions.

3. The mobile radio communication device as claimed in claim 1, wherein the communication between the base station and the mobile radio communication device is performed according to a TDMA-FDD (Time Division Multiplexing Access-Frequency Division Duplex) method, and transmission by the base station is executed according to a TDM (Time Division Multiplexing) method.

4. The mobile radio communication device as claimed in claim 1, wherein the detection of occurrence of the mixing of interfering signals into the downlink frequency is performed by judgment with respect to the data error rate in demodulated reception signals.

5. The mobile radio communication device as claimed in claim 1, wherein the detection of occurrence of the mixing of interfering signals into the uplink frequency is performed by judgment with respect to an RSSI (Received Signal Strength Indicator) signal whose signal level varies corresponding to the field intensity of an interfering reception signal having a carrier frequency equal to the uplink frequency.

6. The mobile radio communication device as claimed in claim 1, wherein the interference informing means informs the base station of the occurrence of the mixing of interfering signals into the downlink frequency and the uplink frequency, using the control channel.

7. The mobile radio communication device as claimed in claim 1, wherein the interference informing means informs the base station of the occurrence of the mixing of interfering signals into the downlink frequency and the uplink frequency, by repeating transmission using the uplink frequency.

8. The mobile radio communication device as claimed in claim 2, wherein each of the two reception systems comprises:

reception means provided with an antenna for receiving signals;

first frequency conversion means for converting the reception signal supplied from the reception means into a first intermediate frequency signal;

second frequency conversion means for converting the first intermediate frequency signal supplied from the first frequency conversion means into a second intermediate frequency signal;

demodulation means for demodulating the second intermediate frequency signal supplied from the second frequency conversion means and thereby outputting a demodulated signal; and an RSSI section for outputting an RSSI (Received Signal Strength Indicator) signal whose signal level varies corresponding to the intensity of the second intermediate frequency signal supplied from the second frequency conversion means and thereby indicating the field intensity of the reception signal.

9. The mobile radio communication device as claimed in claim 8, further comprising:

band pass filters and amplifiers which are placed in front of the first frequency conversion means, between the first frequency conversion means and the second frequency conversion means, and after the second frequency conversion means.

10. The mobile radio communication device as claimed in claim 1, further comprising:

automatic information means for automatically activating the interference informing means when occurrence of the mixing of interfering signals into the downlink frequency or the uplink frequency is detected by the interference detection means, and automatically informing the base station of the occurrence of the interference utilizing the interference informing means.

11. The mobile radio communication device as claimed in claim 1, further comprising:

interference display means for displaying occurrence of interference when occurrence of the mixing of interfering signals into the downlink frequency or the uplink frequency is detected by the interference detection means; and manual operation information means for receiving manual operation of the user who has seen the display on the interference display means and who is requesting transmission of information about the occurrence of the interference to the base station, and informing the base station of the occurrence of the interference utilizing the interference informing means if the user executed the manual operation.

12. The mobile radio communication device as claimed in claim 1, further comprising:

first frequency conversion means for supplying an intermediate frequency signal; and second frequency conversion means for detecting the mixing of said interfering signals in said intermediate frequency signal.

13. The mobile radio communication device as claimed in claim 12, wherein said transmitted information comprises a frequency equal to said intermediate frequency signal supplied by said first frequency conversion means.

14. The mobile radio communication device as claimed in claim 12, wherein said intermediate frequency signal comprises a frequency equal to the difference between said uplink frequency and said downlink frequency.

15. A mobile radio communication device for performing communication with a base station comprising:

interference detection means for detecting occurrence of the mixing of interfering signals into at least one of a downlink frequency and an uplink frequency which are used for the communication between the base station and the mobile radio communication device;

interference informing means for transmitting information about the occurrence of the mixing of interfering signals into the at least one of the downlink frequency and the uplink frequency to the base station in order to let the base station assign the mobile radio communication device new time slots or a new communication carrier frequency;

a transmission system and two reception systems comprising a post-detection selective space diversity system in which one demodulated signal is selected from two demodulated signals outputted by the two reception systems based on the levels of RSSI (Received Signal Strength Indicator) signals which correspond to the field intensity of post-detection reception signals, said two reception systems each comprises:

reception means provided with an antenna for receiving signals;

first frequency conversion means for converting the reception signal supplied from the reception means into a first intermediate frequency signal;

second frequency conversion means for converting the first intermediate frequency signal supplied from the first frequency conversion means into a second intermediate frequency signal;

demodulation means for demodulating the second intermediate frequency signal supplied from the second frequency conversion means and thereby outputting a demodulated signal; and an RSSI section for outputting an RSSI (Received Signal Strength Indicator) signal whose signal level varies corresponding to the intensity of the second intermediate frequency signal supplied from the second frequency conversion means and thereby indicating the field intensity of the reception signal;

antenna function switching means for switching the function of the antenna of the reception system between reception and transmission by selectively connecting the transmission system to the antenna of the reception system in order to utilize the antenna for transmission; and interference detection signal generation means for converting an interfering reception signal having the uplink frequency which has been received by the antenna of the reception system into an interference detection signal whose frequency is equal to the first intermediate frequency and supplying the interference detection signal to the second frequency conversion means of the reception system so that the mixing of interfering signals into the uplink frequency can be detected, wherein each of the two reception systems includes a double superheterodyne system in which demodulation of the reception signals executed after two steps of frequency conversions.

16. The mobile radio communication device as claimed in claim 15, wherein the interference detection signal generation means comprises:

antenna common use means for drawing out the interfering reception signal having the uplink frequency which has been received by the antenna of the reception system in the case where the antenna is used for reception of the interfering reception signal, and supplying a transmission signal outputted by the transmission system to the antenna in the case where the antenna is used for transmission;

mixing means for mixing the interfering reception signal having the uplink frequency which has been drawn out by the antenna common use means with a reception signal having the downlink frequency which has been received by the antenna of the other reception system and thereby converting the interfering reception signal into the interference detection signal; and selection means for executing selection between the first intermediate frequency signal supplied from the first frequency conversion means and the interference detection signal supplied from the mixing means, and supplying the selected signal to the second frequency conversion means.

17. The mobile radio communication device as claimed in claim 16, wherein the antenna common use means comprises a circulator which is placed between the antenna function switching means and the transmission system.

18. The mobile radio communication device as claimed in claim 16, wherein the interference detection signal generation means further includes a high frequency amplifier which is placed between the antenna common use means and the mixing means.

19. A mobile radio communication device for performing communication with a base station, comprising:

an interference detector for detecting an occurrence of a mixing of interfering signals with a downlink frequency and an uplink frequency used for communication between the base station and the mobile radio communication device;

an interference notifier for transmitting information about said occurrence of the mixing of interfering signals with the downlink frequency and the uplink frequency to the base station; and an interference detection signal generator for converting an interfering reception signal having the uplink frequency and received by an antenna of a reception system into an interference detection signal, wherein a frequency of said downlink frequency is different from that of said uplink frequency, and wherein said interference detector mixes said interfering signals having said uplink frequency with said downlink frequency to produce said transmitted information.

20. The mobile radio communication device as claimed in claim 19, wherein the mobile radio communication device uses new time slots or a new communication carrier frequency after transmitting information about said occurrence of the mixing of interfering signals with the downlink frequency and the uplink frequency.

21. The mobile radio communication device as claimed in claim 19, further comprising:

an antenna function switch for switching the function of the antenna of the reception system between reception and transmission by selectively connecting the transmission system to the antenna of the reception system in order to utilize the antenna for transmission.

22. The mobile radio communication device as claimed in claim 19, wherein said interference detection signal comprises a frequency equal to a first intermediate frequency supplied by a first frequency converter, and wherein said interference detection signal is supplied to a second frequency converter of the reception system so that the mixing of interfering signals into the uplink frequency can be detected.

23. The mobile radio communication device as claimed in claim 22, wherein said first intermediate frequency is equal to a difference between an uplink frequency and a downlink frequency.

* * * * *